US012683487B2

(12) United States Patent
Yao et al.

(10) Patent No.: US 12,683,487 B2
(45) Date of Patent: Jul. 14, 2026

(54) POWER CONVERTER AND DETECTION METHOD FOR TERMINAL STATUS

(71) Applicant: HUAWEI DIGITAL POWER TECHNOLOGIES CO., LTD., Shenzhen (CN)

(72) Inventors: Yuan Yao, Shanghai (CN); Xinyu Yu, Shanghai (CN); Kai Xin, Shanghai (CN); Zhaoqi Cai, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 140 days.

(21) Appl. No.: 18/899,666

(22) Filed: Sep. 27, 2024

(65) Prior Publication Data

US 2025/0023456 A1     Jan. 16, 2025

Related U.S. Application Data

(63) Continuation of application No. PCT/CN2024/072029, filed on Jan. 12, 2024.

(30) Foreign Application Priority Data

Jun. 7, 2023     (CN) .......................... 202310674754.4

(51) Int. Cl.
H02M 1/32         (2007.01)
H02J 3/0012       (2026.01)
(Continued)

(52) U.S. Cl.
CPC ........... H02M 1/327 (2021.05); H02J 3/0012 (2020.01); H02J 3/38 (2013.01); H02J 2101/24 (2026.01)

(58) Field of Classification Search
CPC .. H02J 3/0012; H02J 3/001; H02J 3/38; H02J 3/338; H02M 1/327; H02M 1/32
See application file for complete search history.

(56) References Cited

U.S. PATENT DOCUMENTS

2012/0176115 A1*     7/2012     Higuchi ................ H02H 3/087
                                                         323/311
2017/0214256 A1     7/2017     Hardy
(Continued)

FOREIGN PATENT DOCUMENTS

CN         203339645 U     12/2013
CN         107884083 A     4/2018
(Continued)

OTHER PUBLICATIONS

Extended European Search Report in European Appln. No. 24751357.5, mailed on May 9, 2025, 8 pages.
(Continued)

*Primary Examiner* — Nguyen Tran
(74) *Attorney, Agent, or Firm* — Fish & Richardson P.C.

(57) ABSTRACT

Example power converters and detection methods are described. One example power converter includes a control device, a plurality of wiring terminals, a power conversion circuit, and a plurality of temperature detection devices. The control device is configured to: when an absolute value of a difference between a temperature value of one wiring terminal in the plurality of wiring terminals and a first reference temperature value is greater than or equal to a first temperature difference threshold, output a signal indicating that an abnormality occurs in the plurality of wiring terminals. In this application, a relative change of a temperature of one wiring terminal relative to another wiring terminal can be directly determined based on temperature values of the plurality of wiring terminals, thereby quickly determining, based on a magnitude of the relative change, whether there is an abnormal temperature rise caused by loose connections in the plurality of wiring terminals.

16 Claims, 8 Drawing Sheets

(51) Int. Cl.
    *H02J 3/38*       (2006.01)
    *H02J 101/24*     (2026.01)

(56)              References Cited

U.S. PATENT DOCUMENTS

| | | | |
|---|---|---|---|
| 2021/0167673 A1* | 6/2021 | Ieiri ........................ | H02K 11/40 |
| 2024/0388196 A1* | 11/2024 | Yan ........................ | H02M 1/327 |

FOREIGN PATENT DOCUMENTS

| | | | |
|---|---|---|---|
| CN | 108105939 A | 6/2018 | |
| CN | 112068039 A | 12/2020 | |
| CN | 113947872 A | 1/2022 | |
| CN | 115166603 A | 10/2022 | |
| CN | 115411703 A | 11/2022 | |
| CN | 115435926 A | 12/2022 | |
| CN | 116154626 A | 5/2023 | |
| CN | 116879647 A | 10/2023 | |
| JP | 2016058254 A | 4/2016 | |
| JP | 2022136930 A | 9/2022 | |
| KR | 102082152 B1 | 2/2020 | |
| KR | 20210088194 A | 7/2021 | |

OTHER PUBLICATIONS

International Search Report and Written Opinion in International Appin. No. PCT/CN2024/072029, mailed on Apr. 13, 2024, 27 pages (with Machine translation).

* cited by examiner

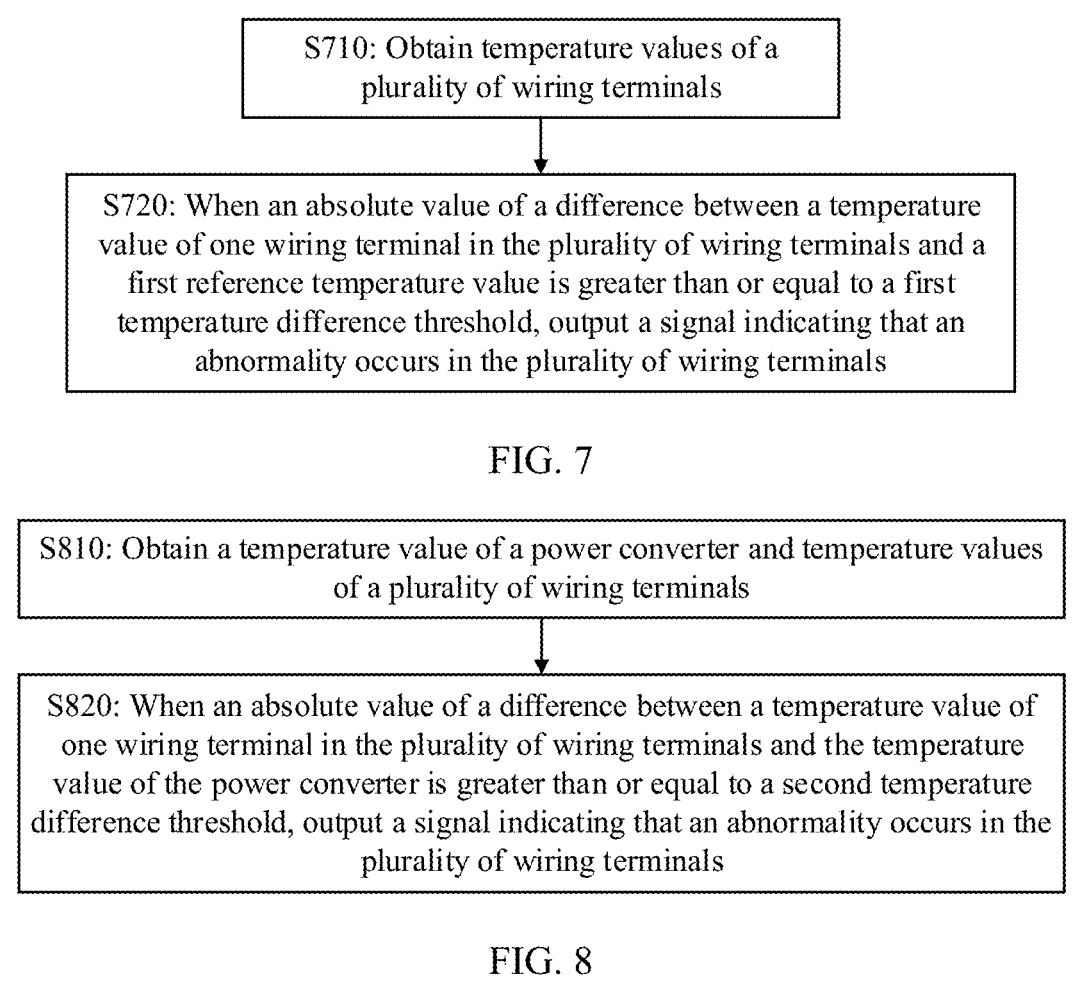

S710: Obtain temperature values of a plurality of wiring terminals

S720: When an absolute value of a difference between a temperature value of one wiring terminal in the plurality of wiring terminals and a first reference temperature value is greater than or equal to a first temperature difference threshold, output a signal indicating that an abnormality occurs in the plurality of wiring terminals

FIG. 7

S810: Obtain a temperature value of a power converter and temperature values of a plurality of wiring terminals S820: When an absolute value of a difference between a temperature value of one wiring terminal in the plurality of wiring terminals and the temperature value of the power converter is greater than or equal to a second temperature difference threshold, output a signal indicating that an abnormality occurs in the plurality of wiring terminals

FIG. 8

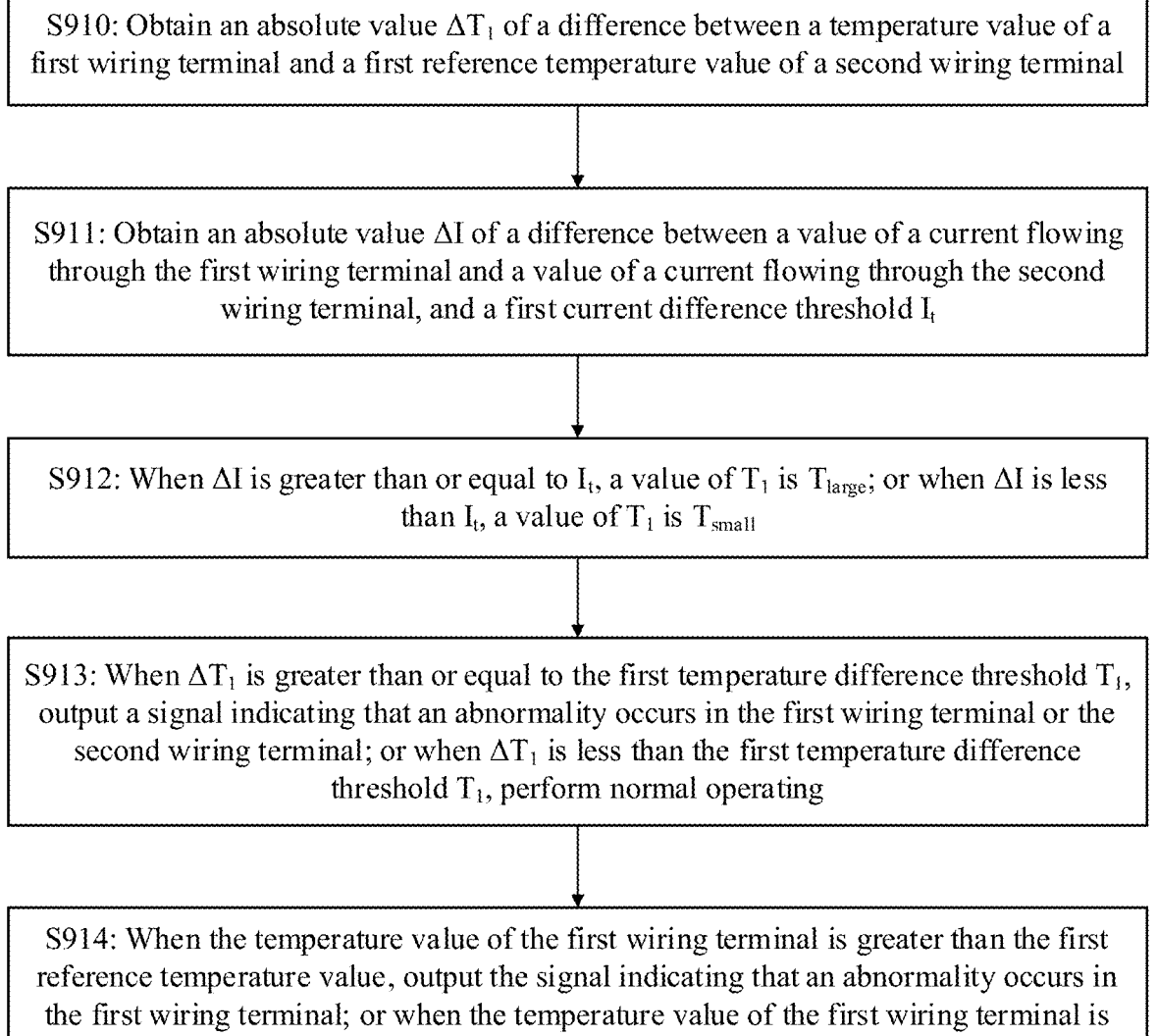

S910: Obtain an absolute value $\Delta T_1$ of a difference between a temperature value of a first wiring terminal and a first reference temperature value of a second wiring terminal S911: Obtain an absolute value $\Delta I$ of a difference between a value of a current flowing through the first wiring terminal and a value of a current flowing through the second wiring terminal, and a first current difference threshold $I_t$ S912: When $\Delta I$ is greater than or equal to $I_t$, a value of $T_1$ is $T_{large}$; or when $\Delta I$ is less than $I_t$, a value of $T_1$ is $T_{small}$ S913: When $\Delta T_1$ is greater than or equal to the first temperature difference threshold $T_1$, output a signal indicating that an abnormality occurs in the first wiring terminal or the second wiring terminal; or when $\Delta T_1$ is less than the first temperature difference threshold $T_1$, perform normal operating S914: When the temperature value of the first wiring terminal is greater than the first reference temperature value, output the signal indicating that an abnormality occurs in the first wiring terminal; or when the temperature value of the first wiring terminal is less than the first reference temperature value, output the signal indicating that an abnormality occurs in the second wiring terminal

FIG. 9

| Input power supply 1101 | Power converter 500 | Load 1102 |

POWER CONVERTER AND DETECTION METHOD FOR TERMINAL STATUS

CROSS-REFERENCE TO RELATED APPLICATIONS

This application is a continuation of International Application No. PCT/CN2024/072029, filed on Jan. 12, 2024, which claims priority to Chinese Patent Application No. 202310674754.4, filed on Jun. 7, 2023. The disclosures of the aforementioned applications are hereby incorporated by reference in their entireties.

TECHNICAL FIELD

This application relates to the field of power device detection, and in particular, to a power converter and a detection method for a terminal status.

BACKGROUND

A wiring terminal is an apparatus for connecting wires or conductors, and may be configured to fasten the wires and provide electrical connections, so that a current can flow between a circuit and a device. The wiring terminal is widely used in scenarios such as household appliances, industrial control panels, and telecommunication devices.

However, when the wiring terminal is loosely connected, a contact resistance increases due to poor contact of a crimping surface. For high-power devices, a loose connection causes a rise in a temperature of the wiring terminal, and eventually the wiring terminal may be burned or the like. In serious cases, fire or a short circuit of the device may occur.

Therefore, how to quickly identify the loose connection of the wiring terminal becomes an urgent problem to be resolved.

SUMMARY

This application provides a power converter and a detection method for a terminal status. Temperature values of a plurality of wiring terminals in the power converter are obtained, so that a relative change of temperatures of any wiring terminal and another wiring terminal may be directly determined, thereby quickly determining, based on a magnitude of the relative change, whether there is an abnormal temperature rise caused by loose connections in the plurality of wiring terminals. Further, this helps improve detection efficiency of determining whether a wiring terminal is loosely connected. In addition, because the relative change of the temperatures of the wiring terminals is compared at a high power, misjudgments caused by a high operating temperature of the wiring terminal can also be reduced.

According to a first aspect, an embodiment of this application provides a power converter. The power converter provided in this embodiment of this application includes a control unit, a plurality of wiring terminals, a power conversion circuit, and a plurality of temperature detection units. First ends of the plurality of wiring terminals are configured to connect to the power conversion circuit, and second ends of the plurality of wiring terminals are configured to connect to an external circuit. The plurality of temperature detection units are configured to detect temperature values of the plurality of wiring terminals; and the control unit is configured to: when an absolute value of a difference between a temperature value of one wiring terminal in the plurality of wiring terminals and a first reference temperature value is greater than or equal to a first temperature difference threshold, output a signal indicating that an abnormality occurs in the plurality of wiring terminals. The first reference temperature value is a temperature value of another wiring terminal other than the one wiring terminal in the plurality of wiring terminals or an average value of temperature values of a plurality of wiring terminals other than the one wiring terminal in the plurality of wiring terminals. Alternatively, the plurality of temperature detection units are configured to detect temperature values of the plurality of wiring terminals and detect a temperature value of the power converter; and the control unit is configured to: when an absolute value of a difference between a temperature value of one wiring terminal in the plurality of wiring terminals and the temperature value of the power converter is greater than or equal to a second temperature difference threshold, output a signal indicating that an abnormality occurs in the plurality of wiring terminals.

According to the power converter provided in this embodiment of this application, an absolute value of a difference between a temperature value of one wiring terminal in the plurality of wiring terminals and a temperature value of another wiring terminal is compared with the first temperature difference threshold, so that whether there is an abnormal temperature rise caused by loose connections in the plurality of wiring terminals may be quickly determined based on a magnitude of a relative change of a temperature of the wiring terminal relative to the another wiring terminal. Further, this helps improve detection efficiency of determining whether the wiring terminal is loosely connected. In addition, the relative change of the temperatures of the wiring terminals, misjudgments caused by a high operating temperature of the wiring terminal may also be reduced, compared to determining, only based on a value of the operating temperature of the wiring terminal, whether there is a loose connection. Moreover, in this embodiment of this application, a relative change of temperatures of one wiring terminal in the plurality of wiring terminals and the power converter can be determined, so that whether there is an abnormal temperature rise caused by a loose connection in the wiring terminal can also be quickly determined based on a magnitude of the relative change. This improves detection efficiency of determining whether the wiring terminal is loosely connected.

With reference to the first aspect, in some implementations of the first aspect, the plurality of wiring terminals include a first wiring terminal and a second wiring terminal, and the first reference temperature value is a temperature value of the second wiring terminal. The control unit is configured to: when an absolute value of a difference between a temperature value of the first wiring terminal and the first reference temperature value is greater than or equal to the first temperature difference threshold, output a signal indicating that an abnormality occurs in the first wiring terminal or the second wiring terminal.

In the foregoing technical solution, the absolute value of the difference between the temperature values of the two wiring terminals is directly compared with a value of the first temperature difference threshold, so that the temperatures of the two wiring terminals can be quickly determined, thereby improving efficiency of detecting a loose connection.

With reference to the first aspect, in some implementations of the first aspect, when the temperature value of the first wiring terminal is greater than the first reference temperature value, the signal indicating that an abnormality occurs in the first wiring terminal is output. Alternatively, when the temperature value of the first wiring terminal is less than the first reference temperature value, the signal indicating that an abnormality occurs in the second wiring terminal is output.

In the foregoing technical solution, the temperature values of the two wiring terminals are further compared, so that a specific wiring terminal in which an abnormality occurs can be determined, and detection accuracy can be improved.

With reference to the first aspect, in some implementations of the first aspect, the plurality of wiring terminals include a third wiring terminal and at least two fourth wiring terminals other than the third wiring terminal, and the first reference temperature value is an average value of temperature values of the at least two fourth wiring terminals. The control unit is configured to: when an absolute value of a difference between a temperature value of the third wiring terminal and the first reference temperature value is greater than or equal to the first temperature difference threshold, output a signal indicating that an abnormality occurs in the third wiring terminal.

In the foregoing technical solution, the temperature value of the third wiring terminal is compared with the average value of the temperature values of the plurality of other wiring terminals, so that a wiring terminal in which an abnormality occurs may be directly determined when an absolute value of a difference between the temperature value of the third wiring terminal and the average value of the temperature values of the plurality of other wiring terminals is greater than or equal to the first temperature difference threshold, thereby improving detection accuracy.

With reference to the first aspect, in some implementations of the first aspect, the plurality of wiring terminals are all current input ends of the power converter. Alternatively, the plurality of wiring terminals are all current output ends of the power converter.

In the foregoing technical solution, it may be ensured that wiring terminals of a same type in the power converter are compared, so that detection accuracy can be improved, and an error generated when operating states of the plurality of wiring terminals are inconsistent is avoided.

With reference to the first aspect, in some implementations of the first aspect, an absolute value of a difference between a value of a current flowing through the one wiring terminal in the plurality of wiring terminals and a value of a current flowing through the another wiring terminal other than the one wiring terminal in the plurality of wiring terminals is less than or equal to a first current difference threshold. Alternatively, an absolute value of a difference between a value of a current flowing through the one wiring terminal in the plurality of wiring terminals and an average value of values of currents flowing through the plurality of wiring terminals other than the one wiring terminal in the plurality of wiring terminals is less than or equal to a second current difference threshold.

In the foregoing technical solution, the absolute value of the difference between the current values of the wiring terminal and other wiring terminals that are compared is within a specific threshold range, thereby ensuring that operating temperatures during normal operating are close to each other, and further improving detection accuracy.

With reference to the first aspect, in some implementations of the first aspect, a larger absolute value of a difference between a value of a current flowing through the one wiring terminal in the plurality of wiring terminals and a value of a current flowing through the another wiring terminal other than the one wiring terminal in the plurality of wiring terminals indicates a larger first temperature difference threshold. Alternatively, a larger absolute value of a difference between a value of a current flowing through the one wiring terminal in the plurality of wiring terminals and an average value of values of currents flowing through the plurality of wiring terminals other than the one wiring terminal in the plurality of wiring terminals indicates a larger first temperature difference threshold.

In the foregoing technical solution, a larger current value of the wiring terminal indicates a higher operating temperature of the wiring terminal. Therefore, in a case in which operating currents of the plurality of wiring terminals are different, a value of the temperature difference threshold may be adjusted based on a difference between current values of different wiring terminals. In this way, higher determining precision is implemented during the temperature comparison, and accuracy of determining a loose connection of the wiring terminal is further improved during temperature detection.

According to a second aspect, an embodiment of this application provides a detection method for a terminal status, applied to a power converter. The power converter includes a control unit, a plurality of wiring terminals, a power conversion circuit, and a plurality of temperature detection units. The method provided in this embodiment of this application includes: obtaining temperature values of the plurality of wiring terminals; and when an absolute value of a difference between a temperature value of one wiring terminal in the plurality of wiring terminals and a first reference temperature value is greater than or equal to a first temperature difference threshold, outputting a signal indicating that an abnormality occurs in the plurality of wiring terminals. The first reference temperature value is a temperature value of another wiring terminal other than the one wiring terminal in the plurality of wiring terminals or an average value of temperature values of a plurality of wiring terminals other than the one wiring terminal in the plurality of wiring terminals. Alternatively, the method includes: obtaining a temperature value of the power converter and temperature values of the plurality of wiring terminals; and when an absolute value of a difference between a temperature value of one wiring terminal in the plurality of wiring terminals and the temperature value of the power converter is greater than or equal to a second temperature difference threshold, outputting a signal indicating that an abnormality occurs in the plurality of wiring terminals.

With reference to the second aspect, in some implementations of the second aspect, the plurality of wiring terminals include a first wiring terminal and a second wiring terminal, and the first reference temperature value is a temperature value of the second wiring terminal. The method in this embodiment of this application includes: when an absolute value of a difference between a temperature value of the first wiring terminal and the first reference temperature value is greater than or equal to the first temperature difference threshold, outputting a signal indicating that an abnormality occurs in the first wiring terminal or the second wiring terminal.

With reference to the second aspect, in some implementations of the second aspect, the method further includes: when the temperature value of the first wiring terminal is greater than the first reference temperature value, outputting the signal indicating that an abnormality occurs in the first wiring terminal. Alternatively, the method further includes: when the temperature value of the first wiring terminal is less than the first reference temperature value, outputting the signal indicating that an abnormality occurs in the second wiring terminal.

With reference to the second aspect, in some implementations of the second aspect, the plurality of wiring terminals include a third wiring terminal and at least two fourth wiring terminals other than the third wiring terminal, and the first reference temperature value is an average value of temperature values of the at least two fourth wiring terminals. The method in this embodiment of this application includes: when an absolute value of a difference between a temperature value of the third wiring terminal and the first reference temperature value is greater than or equal to the first temperature difference threshold, outputting a signal indicating that an abnormality occurs in the third wiring terminal.

With reference to the second aspect, in some implementations of the second aspect, the plurality of wiring terminals are all current input ends of the power converter. Alternatively, the plurality of wiring terminals are all current output ends of the power converter.

With reference to the second aspect, in some implementations of the second aspect, an absolute value of a difference between a value of a current flowing through the one wiring terminal in the plurality of wiring terminals and a value of a current flowing through the another wiring terminal other than the one wiring terminal in the plurality of wiring terminals is less than or equal to a first current difference threshold. Alternatively, an absolute value of a difference between a value of a current flowing through the one wiring terminal in the plurality of wiring terminals and an average value of values of currents flowing through the plurality of wiring terminals other than the one wiring terminal in the plurality of wiring terminals is less than or equal to a second current difference threshold.

With reference to the second aspect, in some implementations of the second aspect, a larger absolute value of a difference between a value of a current flowing through the one wiring terminal in the plurality of wiring terminals and a value of a current flowing through the another wiring terminal other than the one wiring terminal in the plurality of wiring terminals indicates a larger first temperature difference threshold. Alternatively, a larger absolute value of a difference between a value of a current flowing through the one wiring terminal in the plurality of wiring terminals and an average value of values of currents flowing through the plurality of wiring terminals other than the one wiring terminal in the plurality of wiring terminals indicates a larger first temperature difference threshold.

According to a third aspect, an embodiment of this application provides a photovoltaic system, including an input power supply, a load, and the power converter in the first aspect. An input end of the power converter is electrically connected to an output end of the input power supply, and an output end of the power converter is connected to the load through an alternating current bus. The power converter is configured to convert a direct current input by the input power supply into an alternating current, and output the alternating current to the load.

For technical effects that can be achieved in the second aspect and the third aspect, refer to the descriptions of technical effects in the first aspect. Details are not described herein again.

BRIEF DESCRIPTION OF DRAWINGS

FIG. 7 is a schematic flowchart of a detection method for a terminal status according to an embodiment of this application;

FIG. 8 is a schematic flowchart of another detection method for a terminal status according to an embodiment of this application;

FIG. 9 is a schematic flowchart of still another detection method for a terminal status according to an embodiment of this application;

DESCRIPTION OF EMBODIMENTS

Figure 1:
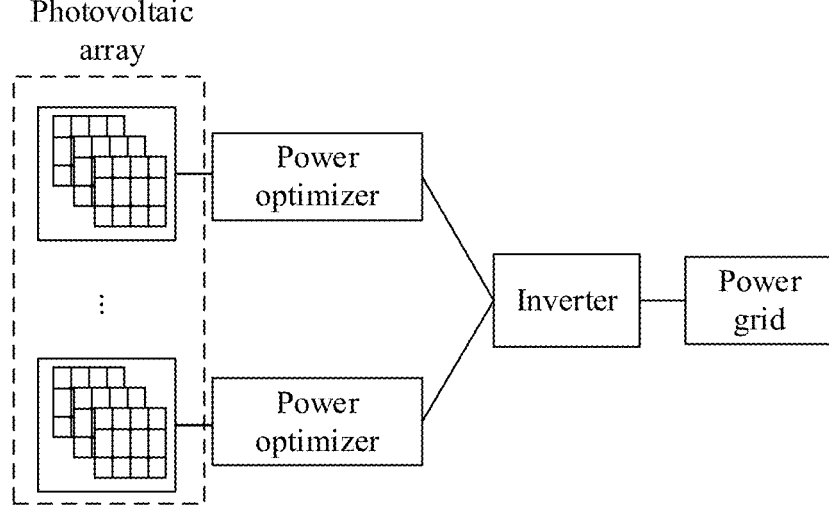
FIG. 1 is a diagram of a photovoltaic power generation system according to an embodiment of this application.

The following describes technical solutions of this application with reference to the accompanying drawings.

In the description of embodiments of this application, "/" means "or" unless otherwise specified. For example, A/B may represent A or B. In this specification, "and/or" describes only an association relationship between associated objects and represents that three relationships may exist. For example, A and/or B may represent the following three cases. Only A exists, both A and B exist, and only B exists. In the accompanying drawings, the same or similar reference numerals represent the same or similar elements or elements having the same or similar functions. The embodiments described below with reference to the accompanying drawings are examples, and are merely intended to explain this application, but cannot be understood as a limitation on this application.

The terms "first", "second", "third", "fourth", and the like (if existent) in this application are intended to distinguish between similar objects but do not necessarily indicate a specific order or sequence. It should be understood that the numbers used in such a way are interchangeable in appropriate circumstances, so that embodiments of this application described herein can be implemented in other orders than the order illustrated or described herein. Sequence numbers of the following processes do not mean execution sequences. The execution sequences of the processes should be determined based on functions and internal logic of the processes, and should not be construed as any limitation on the implementation processes of embodiments of this application. For example, in embodiments of this application, the words "110", "210", "220", and the like are merely identifiers for ease of description, but are not intended to limit an apparatus.

Reference to "some embodiments" or the like described in this specification means that one or more embodiments of this application include a particular feature, structure, or characteristic described with reference to the embodiments. Therefore, statements such as "in some embodiments" that appear at different places in this specification do not necessarily mean reference to a same embodiment. Instead, the statements mean "one or more but not all of embodiments", unless otherwise specifically emphasized in another manner. The terms "include", "comprise", "have", and variations thereof all mean "including but not limited to", unless otherwise specifically emphasized in another manner.

The terms used in embodiments of this application are merely for the purpose of describing specific embodiments, and are not intended to limit embodiments of this application. The terms "a" and "the" of singular forms used in embodiments and the appended claims of this application are also intended to include plural forms, unless otherwise specified in the context clearly. It should also be understood that, the term "and/or" used in this specification indicates and includes any or all possible combinations of one or more associated listed items.

Application scenarios of this application are first described. The photovoltaic system provided in this application may be applicable to different application scenarios such as a photovoltaic power supply scenario and a photovoltaic-storage hybrid power supply scenario, or may be used in a large-scale ground-based power station, an industry and commerce, a family residence, or the like. In the photovoltaic power supply scenario, a power supply is a photovoltaic module. In the photovoltaic-storage hybrid power supply scenario, a power supply includes a photovoltaic module and an energy storage battery string. The following uses the photovoltaic power supply scenario as an example.

FIG. 1 is a diagram of a photovoltaic power generation system according to an embodiment of this application.

In a photovoltaic power supply scenario, as shown in FIG. 1, the photovoltaic power generation system usually includes a photovoltaic array, power optimizers, and a photovoltaic inverter. The photovoltaic array includes a plurality of photovoltaic modules, each photovoltaic module is electrically connected to a power optimizer, the plurality of photovoltaic modules and the power optimizers are connected in series and then connected to an input end of the inverter, and an output end of the inverter is connected to an alternating current power grid or a household device. After the photovoltaic power generation system starts to run, the power optimizer may convert a direct current generated by the photovoltaic module connected to an input end of the power optimizer into a direct current whose voltage is a preset value, and output the direct current to the inverter. The inverter converts the direct current output by the power optimizer into an alternating current. In this way, power is supplied to various types of power-consuming devices such as an alternating current power grid or an alternating current load (for example, a household device).

In this scenario, input ends and output ends of the power optimizer and the inverter are usually connected to external circuits through wiring terminals. The wiring terminal is an apparatus for connecting wires or conductors, and may be configured to fasten the wires and provide electrical connections, so that a current can flow between a circuit and a device. During use, the wiring terminal may be loosely connected or the like due to factors such as device aging and artificial damage. As a result, an abnormality occurs in the wiring terminal. However, an operating power of the photovoltaic inverter is usually high. Therefore, when an abnormality occurs in the wiring terminal, a large output current causes a rapid rise in a temperature of the wiring terminal. This poses hidden dangers to the power generation system, device safety, and personal safety.

Figure 2:
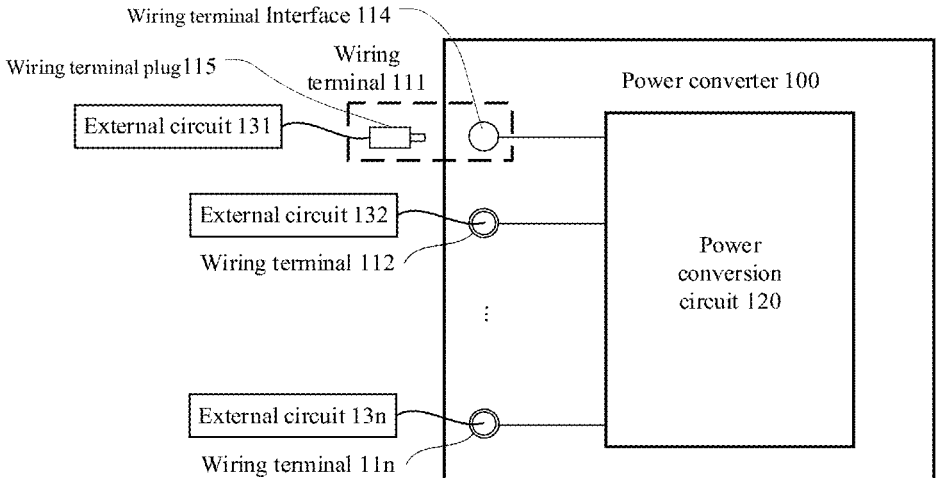
FIG. 2 is a diagram of a power converter in the conventional technology.

FIG. 2 is a diagram of a power converter in the conventional technology. It should be understood that the power converter may be the power optimizer or the inverter above. As shown in FIG. 2, an external circuit 131 is connected to a power conversion circuit 120 of a power converter 100 through a wiring terminal 111. The wiring terminal 111 includes a wiring terminal interface 114 and a wiring terminal plug 115. When a connection between the wiring terminal interface 114 and the wiring terminal plug 115 is abnormal, in other words, an electrical connection between the external circuit 131 and the power conversion circuit 120 is not secure, the foregoing hidden dangers may occur.

In view of this, embodiments of this application provide a power converter and a detection method for a terminal status. An absolute value of a difference between a temperature value of one wiring terminal in a plurality of wiring terminals and a temperature value of another wiring terminal is compared with a first temperature difference threshold, so that whether there is an abnormal temperature rise caused by loose connections in the plurality of wiring terminals may be quickly determined based on a magnitude of a relative change of a temperature of the wiring terminal relative to the another wiring terminal. Further, this helps improve detection efficiency of determining whether the wiring terminal is loosely connected. In addition, the relative change of the temperatures of the wiring terminals, misjudgments caused by a high operating temperature of the wiring terminal may also be reduced, compared to determining, only based on a value of the operating temperature of the wiring terminal, whether there is a loose connection. Moreover, in this embodiment of this application, a relative change of temperatures of one wiring terminal in the plurality of wiring terminals and the power converter can be determined, so that whether there is an abnormal temperature rise caused by a loose connection in the wiring terminal can also be quickly determined based on a magnitude of the relative change. This improves detection efficiency of determining whether the wiring terminal is loosely connected.

With reference to FIG. 3 to FIG. 6, the following describes in detail a structure of a power converter according to an embodiment of this application. It should be understood that examples in FIG. 3 to FIG. 6 are merely intended to help a person skilled in the art understand embodiments of this application, and are not intended to limit embodiments of this application to specific values or specific scenarios in FIG. 3 to FIG. 6. It is clear that a person skilled in the art can make various equivalent modifications or changes based on the provided examples, and such modifications and changes also fall within the scope of embodiments of this application.

The power converter provided in this embodiment of this application includes a control unit, a plurality of wiring terminals, a power conversion circuit, and a plurality of temperature detection units. First ends of the plurality of wiring terminals are configured to connect to the power conversion circuit, and second ends of the plurality of wiring terminals are configured to connect to an external circuit. The plurality of temperature detection units are configured to detect temperature values of the plurality of wiring terminals; and the control unit is configured to: when an absolute value of a difference between a temperature value of one wiring terminal in the plurality of wiring terminals and a first reference temperature value is greater than or equal to a first temperature difference threshold, output a signal indicating that an abnormality occurs in the plurality of wiring terminals. The first reference temperature value is a temperature value of another wiring terminal other than the one wiring terminal in the plurality of wiring terminals or an average value of temperature values of a plurality of wiring terminals other than the one wiring terminal in the plurality of wiring terminals. Alternatively, the plurality of temperature detection units are configured to detect temperature values of the plurality of wiring terminals and detect a temperature value of the power converter; and the control unit is configured to: when an absolute value of a difference between a temperature value of one wiring terminal in the plurality of wiring terminals and the temperature value of the power converter is greater than or equal to a second temperature difference threshold, output a signal indicating that an abnormality occurs in the plurality of wiring terminals.

Figure 3:
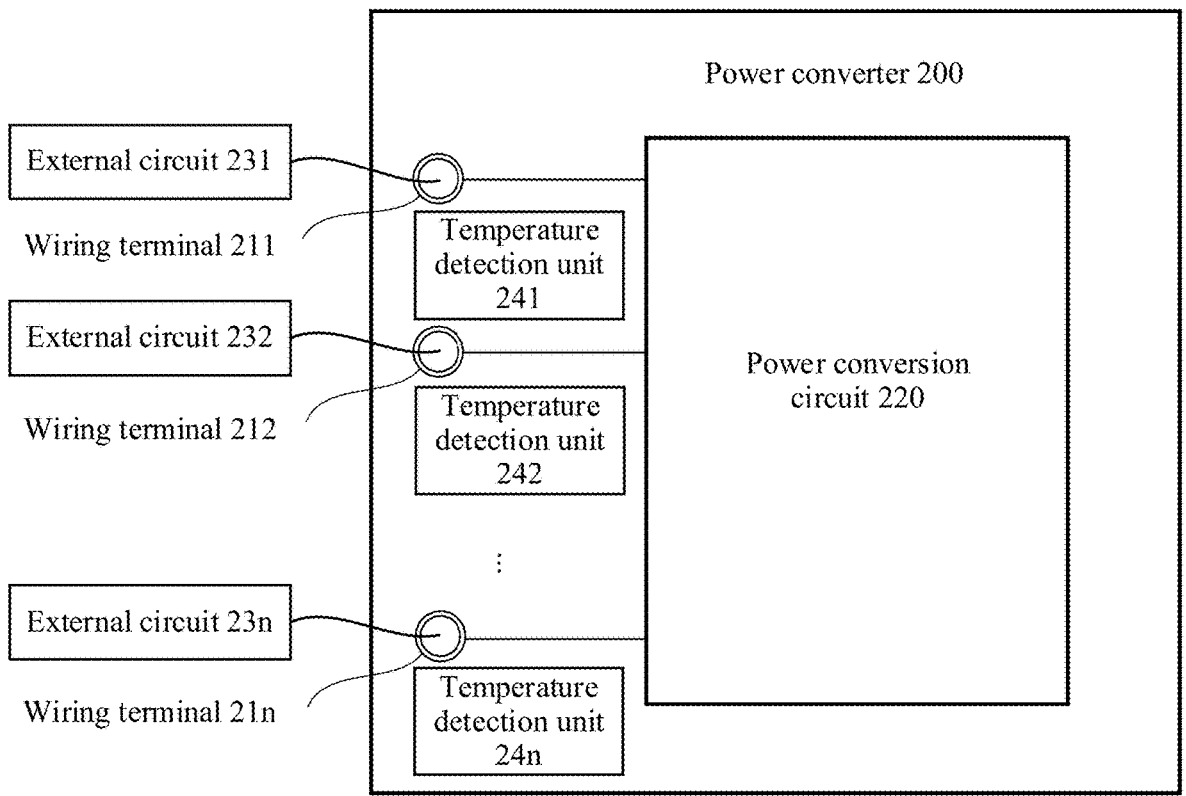
FIG. 3 is a diagram of a power converter according to an embodiment of this application.

FIG. 3 is a diagram of a power converter according to an embodiment of this application. The power converter in this embodiment of this application may be used in a photovoltaic power generation converter device. For example, the power converter is a power optimizer or an inverter in a photovoltaic system. As shown in FIG. 3, the power converter provided in this embodiment of this application includes a control unit (not shown in the figure), a plurality of wiring terminals, a power conversion circuit 220, and a plurality of temperature detection units.

In this embodiment of this application, first ends of the plurality of wiring terminals are configured to connect to the power conversion circuit, and second ends of the plurality of wiring terminals are configured to connect to an external circuit. As shown in FIG. 3, the plurality of wiring terminals include a wiring terminal 211, a wiring terminal 212, . . . , and a wiring terminal 21n. A first end of the wiring terminal 211 is configured to connect to the power conversion circuit 220, and a second end of the wiring terminal 211 is configured to connect to an external circuit 231. A first end of the wiring terminal 212 is configured to connect to the power conversion circuit 220, and a second end of the wiring terminal 212 is configured to connect to an external circuit 232. A first end of the wiring terminal 21n is configured to connect to the power conversion circuit 220, and a second end of the wiring terminal 21n is configured to connect to an external circuit 23n. The external circuit may be a circuit that provides an input for the power converter, or may be a circuit that receives a current output by the power converter. For example, when the power converter is an optimizer, the external circuit may be an input circuit at an end that is of the optimizer and that is connected to a solar panel, or may be an output circuit at an end that is of the optimizer and that is connected to the inverter. When the power converter is an inverter, the external circuit may be a direct current input circuit at an end that is of the inverter and that is connected to a solar panel, an optimizer, or an energy storage unit, or may be an alternating current output circuit at an end that is of the inverter and that is connected to a load or a power grid.

In some embodiments, the wiring terminal 211 includes a wiring terminal interface and a wiring terminal plug. The wiring terminal interface of the wiring terminal 211 is configured to connect to the power conversion circuit 220, and the wiring terminal plug of the wiring terminal 211 is configured to connect to the external circuit 231. Connection manners of the wiring terminal interface and the wiring terminal plug include welding, clamping, insertion, and screw fastening. For example, a screw on the wiring terminal interface is tightened, so that metal pins on the wiring terminal plug are clamped, to implement an electrical connection between the pins. A structure of another wiring terminal is similar to a structure of the wiring terminal 211. Details are not described herein again. For example, the wiring terminal includes a socket-type wiring terminal, a screw-type wiring terminal, a spring-type wiring terminal, and the like.

In this embodiment of this application, the plurality of temperature detection units are configured to detect temperature values of the plurality of wiring terminals. As shown in FIG. 3, the plurality of temperature detection units include a temperature detection unit 241, a temperature detection unit 242, . . . , and a temperature detection unit 24n. The temperature detection unit 241 is configured to detect a temperature value of the wiring terminal 211. The temperature detection unit 242 to the temperature detection unit 24n are similar to the temperature detection unit 241. Details are not described herein again. The temperature detection unit may be a negative temperature coefficient (NTC) thermistor, an infrared temperature sensor, or the like. The temperature detection unit may be disposed on a PCB connected to the wiring terminal, on a wiring terminal interface, on a wiring terminal plug, or in an integrated design with the wiring terminal. The temperature detection unit may be disposed inside or outside the power converter, or on a component of the power converter, for example, a housing of a power device.

In some embodiments, the power converter is one of the following: a direct current/direct current (DC/DC) converter, an alternating current/alternating current (AC/AC) converter, an alternating current/direct current (AC/DC) converter, or a direct current/alternating current (DC/AC) converter. The power conversion circuit in the power converter is configured to convert electrical energy of the external circuit. Specifically, the power conversion circuit is mainly classified into a rectifier circuit, an inverter circuit, an alternating current conversion circuit, and a direct current conversion circuit. Details are not described in this application.

The power conversion circuit may be carried by a printed circuit board (PCB). Specifically, a connection manner between the wiring terminal interface and the PCB includes screw fastening, spring-type connection, bayonet-type connection, welding, and the like. For example, a wire of the wiring terminal interface is clamped in a pin of the PCB through a screw.

For example, the power conversion circuit 220 is an inverter circuit, the external circuit 231 is connected to a photovoltaic array, and the external circuit 232 is connected to a power grid. When the photovoltaic array generates power to the power grid, a direct current generated by the photovoltaic array is connected to the power conversion circuit 220 through the wiring terminal 211. After converting the direct current into an alternating current, the power conversion circuit 220 is connected to the power grid through the wiring terminal 212, to supply power to the power grid.

In this embodiment of this application, the control unit is configured to: when an absolute value of a difference between a temperature value of one wiring terminal in the plurality of wiring terminals and a first reference temperature value is greater than or equal to a first temperature difference threshold, output a signal indicating that an abnormality occurs in the plurality of wiring terminals. The first reference temperature value is a temperature value of another wiring terminal other than the one wiring terminal in the plurality of wiring terminals or an average value of temperature values of a plurality of wiring terminals other than the one wiring terminal in the plurality of wiring terminals. The first temperature difference threshold may be set based on factors such as experimental data, an operating environment, and a safety requirement. In this way, the absolute value of the difference between the temperature value of the one wiring terminal in the plurality of wiring terminals and the temperature value of the another wiring terminal is compared with the first temperature difference threshold, so that whether there is an abnormal temperature rise caused by loose connections in the plurality of wiring terminals may be quickly determined based on a magnitude of a relative change of a temperature of the wiring terminal relative to the another wiring terminal. Further, this helps improve detection efficiency of determining whether the wiring terminal is loosely connected.

In some embodiments, when an absolute value of a difference between a temperature value of one wiring terminal in the plurality of wiring terminals and a first reference temperature value is less than a first temperature difference threshold, normal operating continues.

For example, as shown in FIG. 3, one wiring terminal in the plurality of wiring terminals may be the wiring terminal 211. When an absolute value of a difference between a temperature value of the wiring terminal 211 in the plurality of wiring terminals and a first reference temperature value is greater than or equal to a first temperature difference threshold, a signal indicating that an abnormality occurs in the plurality of wiring terminals is output. The first reference temperature value is a temperature value of another wiring terminal other than the wiring terminal 211 in the plurality of wiring terminals or an average value of temperature values of a plurality of wiring terminals other than the wiring terminal 211 in the plurality of wiring terminals. For example, the first reference temperature value is a temperature value of the wiring terminal 212, or an average value of temperature values of the wiring terminals 212 to 21$n$. If the temperature value of the wiring terminal 211 is 45° C., the first reference temperature value is 40, and the first temperature difference threshold is 5° C., in other words, the absolute value of the difference between the temperature value of the wiring terminal 211° C. and the first reference temperature value is equal to the first temperature difference threshold, the control unit outputs a signal indicating that an abnormality occurs in the plurality of wiring terminals.

Optionally, the first reference temperature value may be an arithmetic average value or a weighted average value of temperature values of a plurality of wiring terminals other than the one wiring terminal in the plurality of wiring terminals.

In this application, the control unit may be an independent device, or may be a device or module integrated in the power converter. A specific form of the control unit is not limited in this application.

Figure 4:
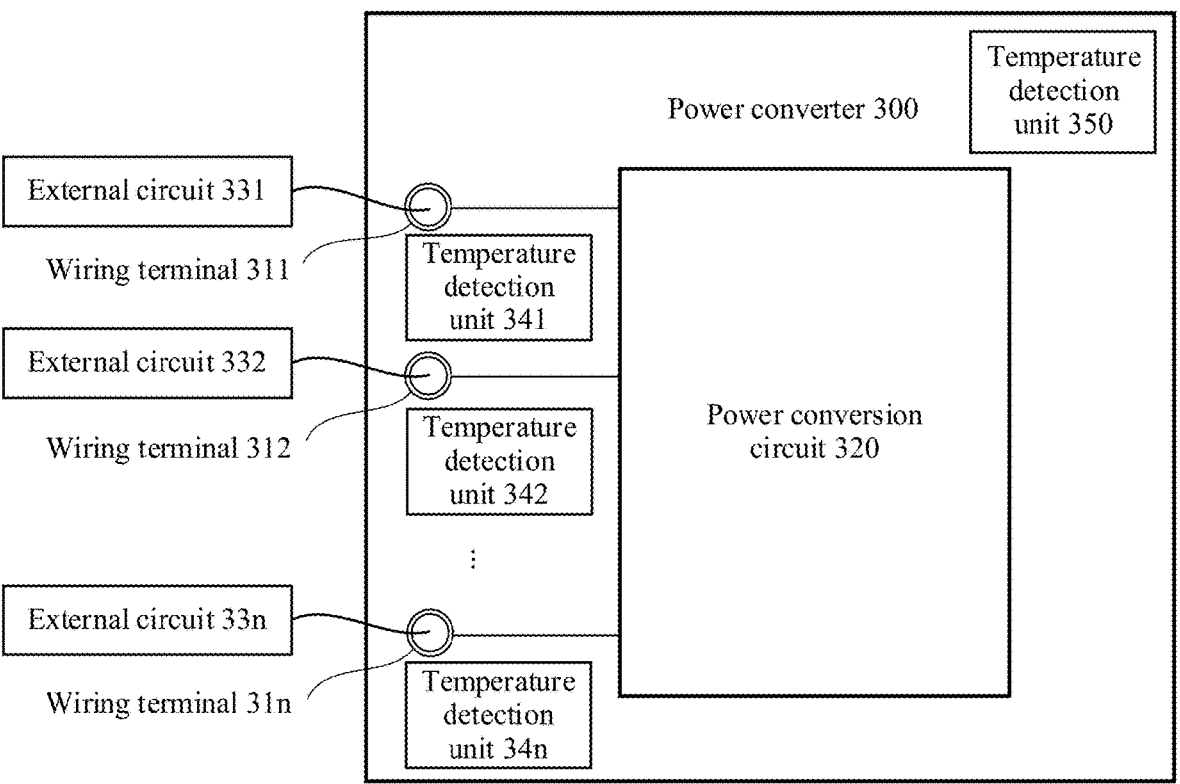
FIG. 4 is a diagram of another power converter according to an embodiment of this application.

FIG. 4 is a diagram of another power converter according to an embodiment of this application. It should be understood that the power converter shown in FIG. 4 includes most technical features of the power converter shown in FIG. 3. The following mainly describes a difference between FIG. 4 and FIG. 3, and most same content thereof is not described again.

In this embodiment of this application, a plurality of temperature detection units are configured to detect temperature values of a plurality of wiring terminals and detect a temperature value of the power converter. Specifically, a temperature detection unit 350 is configured to detect the temperature value of the power converter; and a control unit is configured to: when an absolute value of a difference between a temperature value of one wiring terminal in the plurality of wiring terminals and the temperature value of the power converter is greater than or equal to a second temperature difference threshold, output a signal indicating that an abnormality occurs in the plurality of wiring terminals. The temperature value of the power converter is a temperature inside or outside the power converter, or a temperature of a component of the power converter. For example, the temperature detection unit 350 detects a temperature of a PCB in the power converter 300, a temperature of a housing of the power converter, and the like. The second temperature difference threshold may be set according to factors such as experimental data, an operating environment, and a safety requirement. Optionally, the second temperature difference threshold is greater than a first temperature difference threshold.

For example, if a temperature value of a wiring terminal 311 is 50° C., the temperature value of the power converter is 40° C., and the second temperature difference threshold is 10° C., that is, an absolute value of a difference between the temperature value of the wiring terminal 311 and the temperature value of the power converter is equal to the second temperature difference threshold, the control unit outputs a signal indicating that an abnormality occurs in the plurality of wiring terminals.

Optionally, the control unit is configured to: when an absolute value of a difference between a temperature value of one wiring terminal in the plurality of wiring terminals and the temperature value of the power converter is less than the second temperature difference threshold, continue normal operating.

In this embodiment of this application, the plurality of wiring terminals include a first wiring terminal and a second wiring terminal, and a first reference temperature value is a temperature value of the second wiring terminal. The control unit is configured to: when an absolute value of a difference between a temperature value of the first wiring terminal and the first reference temperature value is greater than or equal to the first temperature difference threshold, output a signal indicating that an abnormality occurs in the first wiring terminal or the second wiring terminal.

For example, as shown in FIG. 4, when the wiring terminal 311 serves as the first wiring terminal and a wiring terminal 312 serves as the second wiring terminal, the first reference temperature value is a temperature value of the wiring terminal 312. For example, when a first temperature difference threshold $T_1$ is set to 5, if the temperature value of the wiring terminal 311 is 40° C., and the temperature value of the wiring terminal 312 is 35° C., an absolute value $\Delta T_1$ of the difference between the temperature value of the first wiring terminal and the first reference temperature value is 5° C., $\Delta T_1$ is equal to $T_1$, and the control unit outputs a signal indicating that an abnormality occurs in the wiring terminal 311 or the wiring terminal 312; and if the temperature value of the wiring terminal 311 is 40° C., and the temperature value of the wiring terminal 312 is 40° C., $\Delta T_1$ is 0° C., $\Delta T_1$ is less than $T_1$, and normal operating continues.

In this embodiment of this application, when the temperature value of the first wiring terminal is greater than the first reference temperature value, the signal indicating that an abnormality occurs in the first wiring terminal is output. Alternatively, when the temperature value of the first wiring terminal is less than the first reference temperature value, the signal indicating that an abnormality occurs in the second wiring terminal is output.

For example, as shown in FIG. 4, the control unit determines a correspondence between temperature data detected by the temperature detection units and the plurality of wiring terminals through a multi-to-one circuit. For example, the control unit determines, through a two-to-one circuit, temperature values that are of the wiring terminal 311 and the wiring terminal 312 and that are detected by a temperature detection unit 341 and a temperature detection unit 342, and the obtained temperature value may correspond to a specific terminal. When the wiring terminal 311 serves as the first wiring terminal, and the wiring terminal 312 serves as the second wiring terminal, if the temperature value of the wiring terminal 311 is 56° C., and the temperature value of the wiring terminal 312 is 50° C., the temperature value of the wiring terminal 311 is greater than the temperature value of the wiring terminal 312, and a signal indicating that an abnormality occurs in the wiring terminal 311 is output; or if the temperature value of the wiring terminal 311 is 40° C., and the temperature value of the wiring terminal 312 is 45° C., the temperature value of the wiring terminal 311 is less than the temperature value of the wiring terminal 312, and a signal indicating that an abnormality occurs in the wiring terminal 312 is output. In addition, the multi-to-one circuit further includes a four-to-one circuit, an eight-to-one circuit, and the like. Details are not described herein again.

In this embodiment of this application, the plurality of wiring terminals include a third wiring terminal and at least two fourth wiring terminals other than the third wiring terminal, and the first reference temperature value is an average value of temperature values of the at least two fourth wiring terminals. The control unit is configured to: when an absolute value of a difference between a temperature value of the third wiring terminal and the first reference temperature value is greater than or equal to the first temperature difference threshold, output a signal indicating that a connection status of the third wiring terminal is abnormal.

For example, as shown in FIG. 4, when the wiring terminal 311 serves as the third wiring terminal, for the at least two fourth wiring terminals other than the third wiring terminal, the wiring terminal 312 to a wiring terminal 3 In may be selected as the fourth wiring terminals. The first reference temperature value is an average value of temperature values of the wiring terminal 312 to the wiring terminal 3 In. If the first temperature difference threshold is 5, the temperature value of the third wiring terminal is 56° C., and the first reference temperature value is 50° C., the temperature value of the third wiring terminal is greater than the first reference temperature value, and a signal indicating that an abnormality occurs in the wiring terminal 311 is output.

It should be understood that there is usually a case in which a plurality of power converters operate simultaneously in a photovoltaic system. Therefore, temperature values of the at least two fourth wiring terminals other than the third wiring terminal may be considered as temperature values when the wiring terminals operate normally. When the absolute value of the difference between the temperature value of the third wiring terminal and the first reference temperature value is greater than or equal to the first temperature difference threshold, it indicates that the temperature value of the third wiring terminal deviates from the temperature value when the wiring terminals operate normally. Therefore, the control unit outputs a signal indicating that an abnormality occurs in the third wiring terminal. This can improve detection efficiency.

In this embodiment of this application, the plurality of wiring terminals are all current input ends of the power converter. Alternatively, the plurality of wiring terminals are all current output ends of the power converter.

The power conversion circuit includes a rectifier circuit, an inverter circuit, an alternating current conversion circuit, and a direct current conversion circuit. As shown in FIG. 4, if a power conversion circuit 320 is an inverter circuit, the wiring terminal 311 is a direct current input end, and the wiring terminal 312 is an alternating current output end. Alternatively, if a power conversion circuit 320 is a direct current conversion circuit, the wiring terminal 311 is a direct current input end, and the wiring terminal 312 is a direct current output end. Currents of the current input end and the current output end change, so that normal operating temperatures may be different. Therefore, the wiring terminals selected for comparison are all current input ends or all current output ends of the power converter. This can improve detection accuracy.

Figure 5:
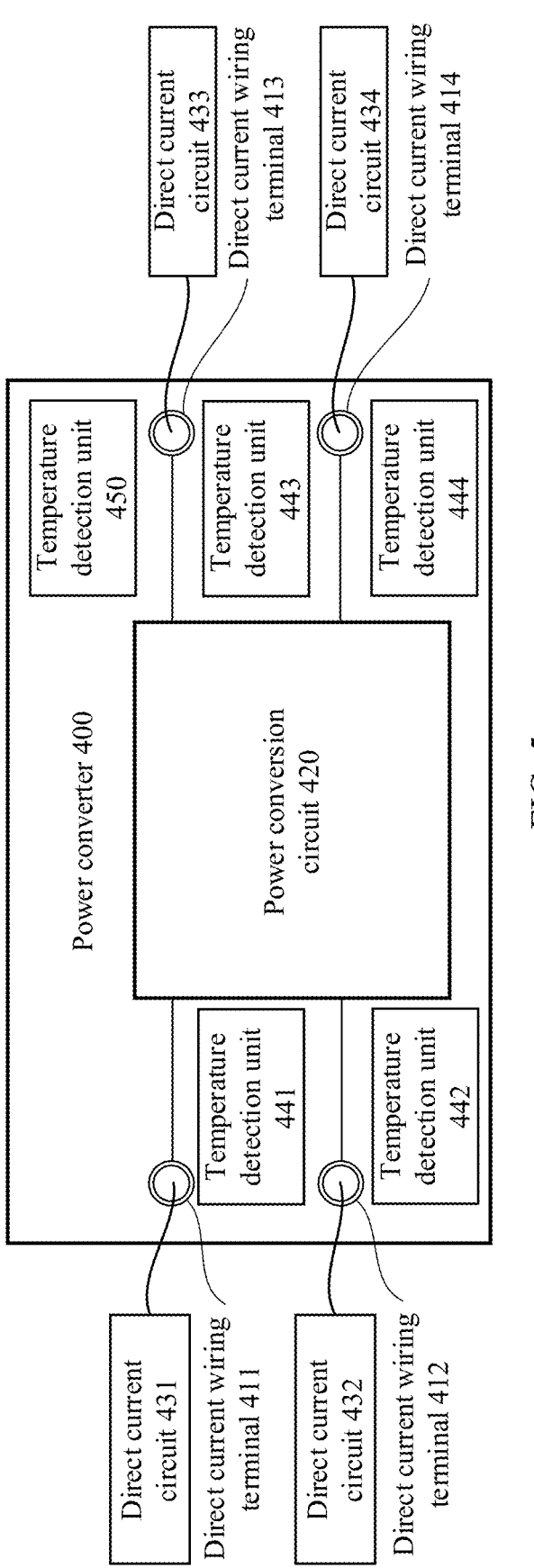
FIG. 5 is a diagram of another power converter according to an embodiment of this application.

Further, FIG. 5 is a diagram of another power converter according to an embodiment of this application.

As shown in FIG. 5, the power converter 400 includes a control unit, a plurality of wiring terminals, a power conversion circuit 420, and a plurality of temperature detection units. The plurality of wiring terminals include a direct current wiring terminal 411, a direct current wiring terminal 412, a direct current wiring terminal 413, and a direct current wiring terminal 414. The power conversion circuit 420 is a direct current conversion circuit, and is configured to convert a direct current into a direct current of another type. A direct current circuit 431 and a direct current circuit 432 are direct current input ends, and a direct current circuit 433 and a direct current circuit 434 are direct current output ends.

In some embodiments, the power converter 400 is a power optimizer, and may adjust, based on a power generation capability of a solar photovoltaic panel, a value of a direct current output by the solar photovoltaic panel, to improve barrel effect of a photovoltaic string. Specifically, the direct current circuit 431 and the direct current circuit 432 are the direct current input ends and may be connected to a solar photovoltaic panel, and the direct current circuit 433 and the direct current circuit 434 are the direct current output ends and may be connected to an input end of an inverter. When an abnormality occurs in a terminal of the optimizer, a temperature may also be abnormal. Both an input terminal and an output terminal of the optimizer can be detected with reference to the foregoing embodiments. An input current and an output current of the optimizer are usually different. Therefore, wiring terminals at a same end are usually selected for temperature comparison to determine whether an abnormality exists. For example, when the direct current wiring terminal 411 at the input end serves as a first wiring terminal, a first reference temperature value is a temperature value of the direct current wiring terminal 412 at the input end. When the direct current wiring terminal 413 at the output end serves as a first wiring terminal, a first reference temperature value is a temperature value of the direct current wiring terminal 414 at the output end.

Figure 6:
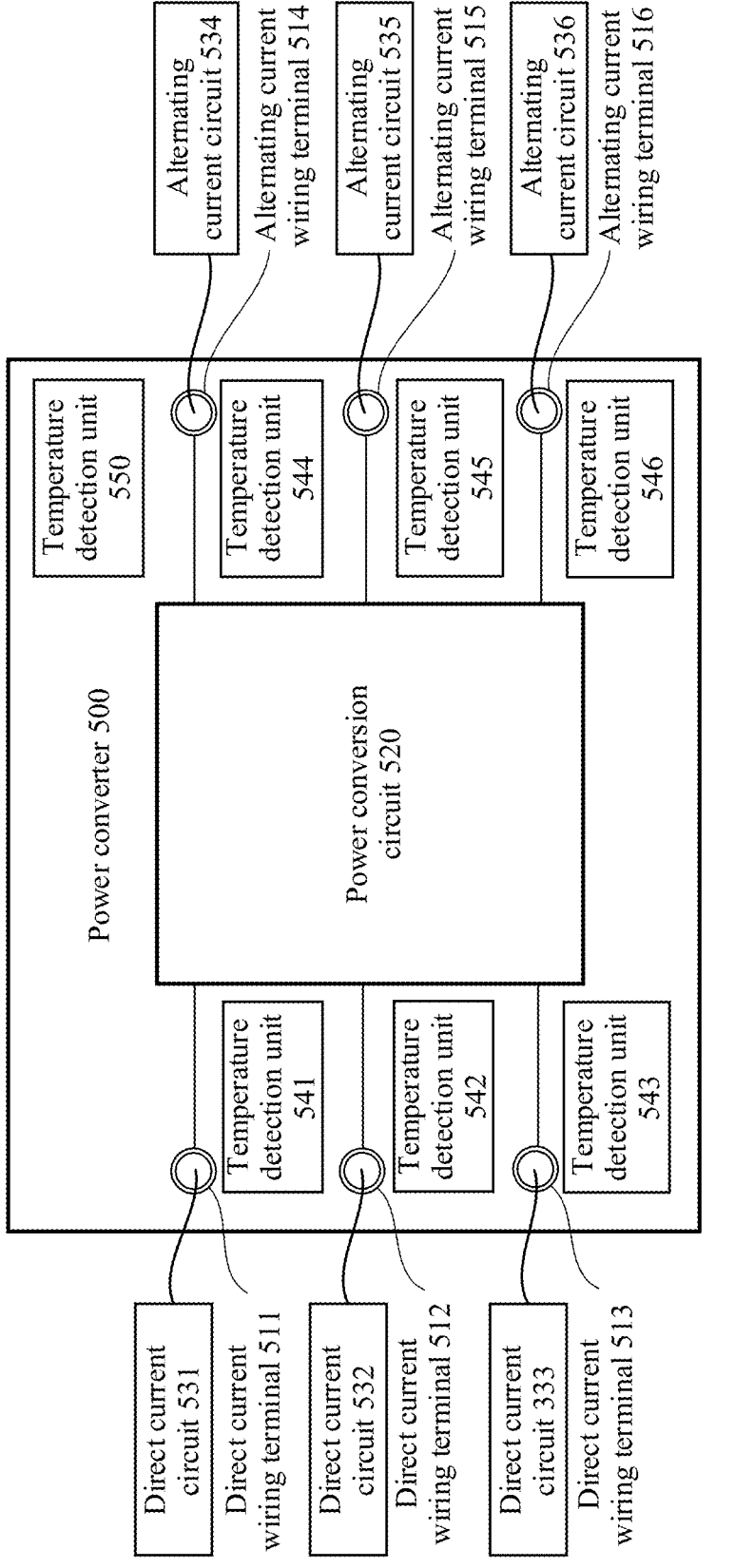
FIG. 6 is a diagram of another power converter according to an embodiment of this application.

The following describes another embodiment of this application with reference to FIG. 6.

FIG. 6 is a diagram of another power converter according to an embodiment of this application. As shown in FIG. 6, the power converter 500 includes a control unit, a plurality of wiring terminals, a power conversion circuit 520, and a plurality of temperature detection units. First ends of the plurality of wiring terminals are configured to connect to the power conversion circuit, and second ends of the plurality of wiring terminals are configured to connect to an external circuit.

In some embodiments, the power converter 500 is an inverter, and may convert a direct current output by a power optimizer into an alternating current used by a load. The power converter shown in FIG. 6 is a diagram of a structure of an inverter. Specifically, a direct current wiring terminal 511, a direct current wiring terminal 512, and a direct current wiring terminal 513 are direct current input ends, and may be connected to the power optimizer. An alternating current wiring terminal 514, an alternating current wiring terminal 515, and an alternating current wiring terminal 516 are alternating current output ends, and may be connected to an input end of the load. The power conversion circuit 520 is an inverter circuit, and is configured to convert a direct current into an alternating current.

For example, as shown in FIG. 6, when the direct current wiring terminal 511 serves as a third wiring terminal, the direct current wiring terminal 512 and the direct current wiring terminal 513 other than the third wiring terminal may be selected as fourth wiring terminals. A first reference temperature value is an average value of temperature values of the direct current wiring terminal 512 and the direct current wiring terminal 513. The control unit is configured to: when an absolute value of a difference between a temperature value of the direct current wiring terminal 511 and the first reference temperature value is greater than or equal to a first temperature difference threshold, output a signal indicating that an abnormality occurs in the direct current wiring terminal 511. For example, when a first temperature difference threshold $T_1$ is set to 5, if the temperature value of the direct current wiring terminal 511 is 40° C., and temperature values of the direct current wiring terminal 512 and the direct current wiring terminal 513 are respectively 33° C. and 35° C., that is, the first reference temperature value is 34° C., an absolute value $\Delta T_1$ of the difference between the temperature value of the direct current wiring terminal 511 and the first reference temperature value is 6° C., $\Delta T_1$ is greater than $T_1$, and the control unit outputs a signal indicating that an abnormality occurs in the direct current wiring terminal 511.

In this embodiment of this application, an absolute value of a difference between a value of a current flowing through one wiring terminal in the plurality of wiring terminals and a value of a current flowing through another wiring terminal other than the one wiring terminal in the plurality of wiring terminals is less than or equal to a first current difference threshold. Alternatively, an absolute value of a difference between a value of a current flowing through one wiring terminal in the plurality of wiring terminals and an average value of values of currents flowing through a plurality of wiring terminals other than the one wiring terminal in the plurality of wiring terminals is less than or equal to a second current difference threshold. In this way, the absolute value of the difference between the current values of the wiring terminal and other wiring terminals that are compared is within a specific threshold range, thereby ensuring that operating temperatures during normal operating are close to each other, and further improving detection accuracy.

For example, as shown in FIG. 5, when the direct current wiring terminal 411 serves as the first wiring terminal, and the direct current wiring terminal 412 serves as another wiring terminal other than the direct current wiring terminal 411 in the plurality of wiring terminals, if an absolute value of a difference between a value of a current flowing through the direct current wiring terminal 411 and a value of a current flowing through the direct current wiring terminal 412 is less than or equal to the first current difference threshold, it may be considered that the value of the current flowing through the direct current wiring terminal 411 is close to the value of the current flowing through the direct current wiring terminal 412. Therefore, operating temperatures are close in a case of normal operating, so that whether an abnormality occurs in the plurality of wiring terminals may be further determined based on actual operating temperatures. For another example, as shown in FIG. 6, when the direct current wiring terminal 511 serves as the first wiring terminal, and the direct current wiring terminal 512 and the direct current wiring terminal 513 serve as a plurality of wiring terminals other than the direct current wiring terminal 511 in the plurality of wiring terminals, if an absolute value of a difference between a value of a current flowing through the direct current wiring terminal 511 and an average value of values of currents flowing through the direct current wiring terminal 512 and the direct current wiring terminal 513 is less than or equal to a second current difference threshold, it may be considered that the value of the current flowing through the direct current wiring terminal 511 is close to the average value of the values of the currents flowing through the other normally operating wiring terminals. Therefore, operating temperatures are close in a case of normal operating, so that whether an abnormality occurs in the plurality of wiring terminals may be further determined based on actual operating temperatures. The first current difference threshold and the second current difference threshold may be set according to factors such as an operating environment and a safety requirement.

It should be understood that a value of a current flowing through an alternating current wiring terminal is an effective current value of an alternating current circuit. A value of a current in a direct current circuit and an effective current value in an alternating current circuit can be measured by using a current detection apparatus. In the alternating current circuit, both a voltage and a current vary with time. Therefore, peak values or maximum values of the voltage and the current cannot directly represent values of the voltage and the current. The effective current value is an important parameter of an alternating current signal, is usually calculated by using a root mean square (RMS), and may represent a value of the alternating current signal. For example, an alternating current whose effective current value is 10 A indicates that an average power of the alternating current signal is equal to a power of a 10 A direct current signal.

In this embodiment of this application, a larger absolute value of a difference between a value of a current flowing through the one wiring terminal in the plurality of wiring terminals and a value of a current flowing through the another wiring terminal other than the one wiring terminal in the plurality of wiring terminals indicates a larger first temperature difference threshold. Alternatively, a larger absolute value of a difference between a value of a current flowing through the one wiring terminal in the plurality of wiring terminals and an average value of values of currents flowing through a plurality of wiring terminals other than the one wiring terminal in the plurality of wiring terminals indicates a larger first temperature difference threshold. In a case in which operating currents of the plurality of wiring terminals are different, a value of the temperature difference threshold may be adjusted based on a difference between current values of different wiring terminals. In this way, higher determining precision is implemented during the temperature comparison, and accuracy of determining a loose connection of the wiring terminal is further improved during temperature detection.

For example, as shown in FIG. 6, when the absolute value of the difference between the value of the current flowing through the direct current wiring terminal 511 and the value of the current flowing through the direct current wiring terminal 512 is 1, and the absolute value of the difference between the value of the current flowing through the direct current wiring terminal 511 and the value of the current flowing through the direct current wiring terminal 513 is 2, if an absolute value of a difference between the temperature value of the direct current wiring terminal 511 and the temperature value of the direct current wiring terminal 512 is calculated, the first temperature difference threshold may be 5° C.; and if an absolute value of a difference between the temperature value of the direct current wiring terminal 511 and the temperature value of the direct current wiring terminal 513 is calculated, the first temperature difference threshold may be 10° C. In other words, a larger absolute value of the difference between the compared current values indicates a larger first temperature difference threshold.

Optionally, an absolute value of a difference between a value of a current flowing through the one wiring terminal in the plurality of wiring terminals and a value of a current flowing through the another wiring terminal other than the one wiring terminal in the plurality of wiring terminals is linearly related to a change of the first temperature difference threshold. Alternatively, an absolute value of a difference between a value of a current flowing through the one wiring terminal in the plurality of wiring terminals and an average value of values of currents flowing through the plurality of wiring terminals other than the one wiring terminal in the plurality of wiring terminals is linearly related to a change of the first temperature difference threshold. For example, as shown in FIG. 6, an absolute value of a difference between a value of a current flowing through the direct current wiring terminal 511 and a value of a current flowing through the direct current wiring terminal 512 is x, the first temperature difference threshold is y, and the control unit may determine a value of the first temperature difference threshold y according to the calculated x and a formula y=kx, where k is a proportional coefficient, and may be set according to factors such as experimental data, an operating environment, and a safety requirement.

Optionally, an absolute value of a difference between a value of a current flowing through the one wiring terminal in the plurality of wiring terminals and a value of a current flowing through the another wiring terminal other than the one wiring terminal in the plurality of wiring terminals or an absolute value $\Delta I$ of a difference between a value of a current flowing through the one wiring terminal in the plurality of wiring terminals and an average value of values of currents flowing through the plurality of wiring terminals other than the one wiring terminal in the plurality of wiring terminals is not linearly related to a change of the first temperature difference threshold. For example, different current thresholds $I_1$, $I_2$, and $I_3$ may be set. In a case of $I_1 < \Delta I \leq I_2$, a value of a first temperature difference threshold $T_1$ may be set to T'. In a case of $I_2 < \Delta I \leq I_3$, a value of a first temperature difference threshold $T_1$ may be set to T".

With reference to FIG. 7 to FIG. 9, the following describes in detail a detection method for a terminal status according to an embodiment of this application. It should be understood that the method described below can be applied to the apparatuses in the foregoing embodiments of this application. To avoid unnecessary repetition, when the method in embodiments of this application is described below, refer to functions of the foregoing apparatuses, and repeated descriptions are appropriately omitted.

Based on the power converters shown in FIG. 3, FIG. 5, and FIG. 6, this application provides a detection method for a terminal status, as shown in FIG. 7.

FIG. 7 is a schematic flowchart of a detection method for a terminal status according to an embodiment of this application. It should be understood that the power converter includes a control unit, a plurality of wiring terminals, a power conversion circuit, and a plurality of temperature detection units.

S710: Obtain temperature values of a plurality of wiring terminals.

The temperature values of the plurality of wiring terminals may be detected by using the temperature detection units.

S720: When an absolute value of a difference between a temperature value of one wiring terminal in the plurality of wiring terminals and a first reference temperature value is greater than or equal to a first temperature difference threshold, output a signal indicating that an abnormality occurs in the plurality of wiring terminals.

The first reference temperature value is a temperature value of another wiring terminal other than the one wiring terminal in the plurality of wiring terminals or an average value of temperature values of a plurality of wiring terminals other than the one wiring terminal in the plurality of wiring terminals.

Optionally, S720 includes the following steps.

S721: When an absolute value of a difference between a temperature value of a first wiring terminal and the first reference temperature value is greater than or equal to the first temperature difference threshold, output a signal indicating that an abnormality occurs in the first wiring terminal or a second wiring terminal. The plurality of wiring terminals include the first wiring terminal and the second wiring terminal, and the first reference temperature value is a temperature value of the second wiring terminal.

S722: When the temperature value of the first wiring terminal is greater than the first reference temperature value, output the signal indicating that an abnormality occurs in the first wiring terminal; or when the temperature value of the first wiring terminal is less than the first reference temperature value, output the signal indicating that an abnormality occurs in the second wiring terminal. Alternatively, S720 includes the following step.

S723: When an absolute value of a difference between a temperature value of a third wiring terminal and the first reference temperature value is greater than or equal to the first temperature difference threshold, output a signal indicating that an abnormality occurs in the third wiring terminal. The plurality of wiring terminals include the third wiring terminal and at least two fourth wiring terminals other than the third wiring terminal, and the first reference temperature value is an average value of temperature values of the at least two fourth wiring terminals.

According to the embodiment shown in FIG. 7, when the absolute value of the difference between the temperature value of the one wiring terminal in the plurality of wiring terminals and the first reference temperature value is greater than or equal to the first temperature difference threshold, the signal indicating that an abnormality occurs in the plurality of wiring terminals may be output. In this way, loose connections of the wiring terminals can be found in a timely manner. In addition, the relative change of the temperatures of the wiring terminals, misjudgments caused by a high operating temperature of the wiring terminal may also be reduced, compared to determining, only based on a value of the operating temperature of the wiring terminal, whether there is a loose connection. It should be understood that, when embodiments of this application are applied to the power converter shown in FIG. 3, the plurality of wiring terminals in embodiments of this application may be the wiring terminal 211 to the wiring terminal 21n, and the temperature values of the plurality of wiring terminals may be obtained by the temperature detection unit 241 to the temperature detection unit 24n.

Based on the power converter shown in FIG. 4, this application provides another detection method for a terminal status, as shown in FIG. 8.

FIG. 8 is a schematic flowchart of another detection method for a terminal status according to an embodiment of this application.

S810: Obtain a temperature value of the power converter and temperature values of a plurality of wiring terminals.

S820: When an absolute value of a difference between a temperature value of one wiring terminal in the plurality of wiring terminals and the temperature value of the power converter is greater than or equal to a second temperature difference threshold, output a signal indicating that an abnormality occurs in the plurality of wiring terminals.

According to the embodiment shown in FIG. 8, a relative change of the temperatures of the one wiring terminal in the plurality of wiring terminals and the power converter can be determined, so that whether a wiring terminal is loosely connected is determined based on a magnitude of the relative change. This improves detection efficiency. It should be understood that the plurality of wiring terminals in this embodiment of this application may be the wiring terminal 311 to the wiring terminal 3 In, and the temperature value of the power converter may be obtained by the temperature detection unit 350.

Based on the power converters shown in FIG. 3 to FIG. 6, this application provides still another detection method for a terminal status, as shown in FIG. 9.

FIG. 9 is a schematic flowchart of still another detection method for a terminal status according to an embodiment of this application. In this application, the method provided in FIG. 9 may be separately combined with the method provided in the foregoing embodiments. A specific implementation is shown in FIG. 9.

S910: Obtain an absolute value $\Delta T_1$ of a difference between a temperature value of a first wiring terminal and a first reference temperature value of a second wiring terminal.

The first wiring terminal is one wiring terminal in a plurality of wiring terminals, and the second wiring terminal is another wiring terminal other than the first wiring terminal in the plurality of wiring terminals.

S911: Obtain an absolute value $\Delta I$ of a difference between a value of a current flowing through the first wiring terminal and a value of a current flowing through the second wiring terminal, and a first current difference threshold $I_r$.

S912: When $\Delta I$ is greater than or equal to $I_r$, a value of $T_1$ is $T_{large}$; or when $\Delta I$ is less than $I_r$, a value of $T_1$ is $T_{small}$.

When $\Delta I$ is greater than or equal to $I_r$, it indicates that an operating current difference between the first wiring terminal and the second wiring terminal is large. In other words, a normal operating temperature difference between the first wiring terminal and the second wiring terminal is also large. In this case, the value of $T_1$ is $T_{large}$. When $\Delta I$ is less than $I_r$, it indicates that an operating current of the first wiring terminal is close to that of the second wiring terminal. In other words, a normal operating temperature difference between the first wiring terminal and the second wiring terminal is small. In this case, the value of $T_1$ is $T_{small}$.

Optionally, when $\Delta I$ is greater than or equal to $I_r$, a larger absolute value $\Delta I$ of the difference between the value of the current flowing through the first wiring terminal and the value of the current flowing through the second wiring terminal indicates a larger first temperature difference threshold $T_1$.

S913: When $\Delta T_1$ is greater than or equal to the first temperature difference threshold $T_1$, output a signal indicating that an abnormality occurs in the first wiring terminal or the second wiring terminal; or when $\Delta T_1$ is less than the first temperature difference threshold $T_1$, perform normal operating.

When $\Delta T_1$ is greater than or equal to the first temperature difference threshold $T_1$, it indicates that a difference between the temperature of the first wiring terminal and the temperature of the second wiring terminal is too large, and an abnormality occurs. In this case, a signal indicating that an abnormality occurs in the first wiring terminal or the second wiring terminal is output.

S914: When the temperature value of the first wiring terminal is greater than the first reference temperature value, output the signal indicating that an abnormality occurs in the first wiring terminal; or when the temperature value of the first wiring terminal is less than the first reference temperature value, output the signal indicating that an abnormality occurs in the second wiring terminal.

If the temperature value of the first wiring terminal is greater than the first reference temperature value, it indicates that the temperature value of the first wiring terminal is higher. In this case, the signal indicating that an abnormality occurs in the first wiring terminal is output. If the temperature value of the first wiring terminal is less than the first reference temperature value, it indicates that the temperature value of the second wiring terminal is higher. In this case, the signal indicating that an abnormality occurs in the second wiring terminal is output.

Figures 10, 11:
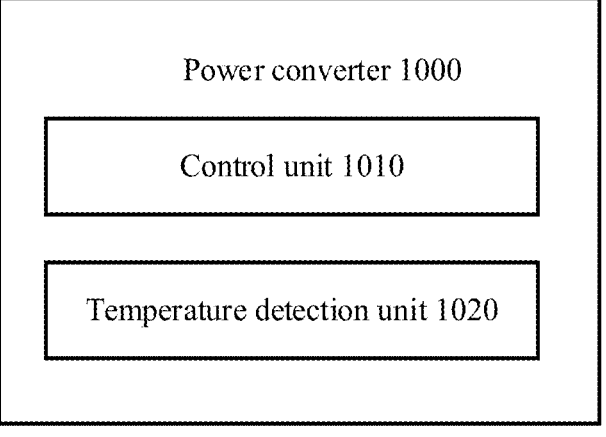
FIG. 10 is a block diagram of a power converter according to an embodiment of this application.
FIG. 11 is a diagram of a photovoltaic system according to an embodiment of this application.

FIG. 10 is a block diagram of a power converter according to an embodiment of this application.

As shown in FIG. 10, the power converter 1000 provided in this embodiment of this application includes a control unit 1010, a plurality of wiring terminals, a power conversion circuit, and a plurality of temperature detection units 1020. First ends of the plurality of wiring terminals are configured to connect to the power conversion circuit, and second ends of the plurality of wiring terminals are configured to connect to an external circuit. The plurality of temperature detection units 1020 are configured to detect temperature values of the plurality of wiring terminals; and the control unit 1010 is configured to: when an absolute value of a difference between a temperature value of one wiring terminal in the plurality of wiring terminals and a first reference temperature value is greater than or equal to a first temperature difference threshold, output a signal indicating that an abnormality occurs in the plurality of wiring terminals. The first reference temperature value is a temperature value of another wiring terminal other than the one wiring terminal in the plurality of wiring terminals or an average value of temperature values of a plurality of wiring terminals other than the one wiring terminal in the plurality of wiring terminals. Alternatively, the plurality of temperature detection units 1020 are configured to detect temperature values of the plurality of wiring terminals and detect a temperature value of the power converter; and the control unit 1010 is configured to: when an absolute value of a difference between a temperature value of one wiring terminal in the plurality of wiring terminals and the temperature value of the power converter is greater than or equal to a second temperature difference threshold, output a signal indicating that an abnormality occurs in the plurality of wiring terminals.

For a specific structure and function of the power converter 1000 provided in embodiments of this application, refer to the embodiments of the corresponding apparatus and method in the foregoing power converters. Details are not described herein again.

FIG. 11 is a diagram of a photovoltaic system according to an embodiment of this application.

As shown in FIG. 11, the photovoltaic system includes an input power supply 1101, a load 1102, and the power converter 500 in embodiments in FIG. 6. An input end of the power converter 500 is electrically connected to an output end of the input power supply 1101, and an output end of the power converter 500 is connected to the load 1102 through an alternating current bus. The power converter 500 is configured to convert a direct current input by the input power supply 1101 into an alternating current, and output the alternating current to the load 1102. The load 1102 includes an alternating current power grid.

In a possible implementation, the photovoltaic system is a photovoltaic power supply system. The photovoltaic power supply system includes a photovoltaic array, a power grid, and a photovoltaic inverter. An input end of the photovoltaic inverter is electrically connected to an output end of the photovoltaic array, and an output end of the photovoltaic inverter is connected to the power grid through an alternating current bus. The photovoltaic inverter is configured to convert a direct current output by the photovoltaic array into an alternating current, and output the alternating current to the power grid. A photovoltaic component in the photovoltaic array is connected to a power optimizer, and the power optimizer may be the power converter 400 in embodiments in FIG. 5.

It should be understood that structures of components and relationships between components that are shown in the foregoing diagrams are merely examples for description, and any replaceable structure of a component that has a same function as each component falls within the protection scope of embodiments of this application.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

It should be understood that, in embodiments of this application, sequence numbers of the foregoing processes do not mean execution sequences. The execution sequences of the processes should be determined based on functions and internal logic of the processes, and should not be construed as any limitation on the implementation processes of embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power converter, comprising:
a power conversion circuit;
a plurality of wiring terminals, wherein first ends of the plurality of wiring terminals are configured to connect to the power conversion circuit, and second ends of the plurality of wiring terminals are configured to connect to an external circuit;

a plurality of temperature detection devices, configured to detect temperature values of the plurality of wiring terminals; and
a control device, configured to:
in response to determining that an absolute value of a difference between a temperature value of one wiring terminal in the plurality of wiring terminals and a first reference temperature value is greater than or equal to a first temperature difference threshold, output a signal indicating that an abnormality occurs in the plurality of wiring terminals,
wherein the first reference temperature value is a temperature value of another wiring terminal other than the one wiring terminal in the plurality of wiring terminals, or the first reference temperature value is an average value of temperature values of a plurality of wiring terminals other than the one wiring terminal in the plurality of wiring terminals.

2. The power converter according to claim 1, wherein:
the plurality of wiring terminals comprise a first wiring terminal and a second wiring terminal, and the first reference temperature value is a temperature value of the second wiring terminal; and
the control device is configured to:
in response to determining that an absolute value of a difference between a temperature value of the first wiring terminal and the first reference temperature value is greater than or equal to the first temperature difference threshold, output a signal indicating that an abnormality occurs in the first wiring terminal or the second wiring terminal.

3. The power converter according to claim 2, wherein that the control device is configured to: in response to determining that an absolute value of a difference between a temperature value of the first wiring terminal and the first reference temperature value is greater than or equal to the first temperature difference threshold, output a signal indicating that an abnormality occurs in the first wiring terminal or the second wiring terminal comprises:
in response to determining that the temperature value of the first wiring terminal is greater than the first reference temperature value, the signal indicating that an abnormality occurs in the first wiring terminal is output; or
in response to determining that the temperature value of the first wiring terminal is less than the first reference temperature value, the signal indicating that an abnormality occurs in the second wiring terminal is output.

4. The power converter according to claim 1, wherein:
the plurality of wiring terminals comprise a third wiring terminal and at least two fourth wiring terminals other than the third wiring terminal, and the first reference temperature value is an average value of temperature values of the at least two fourth wiring terminals; and
the control device is configured to:
in response to determining that an absolute value of a difference between a temperature value of the third wiring terminal and the first reference temperature value is greater than or equal to the first temperature difference threshold, output a signal indicating that an abnormality occurs in the third wiring terminal.

5. The power converter according to claim 1, wherein:
the plurality of wiring terminals are all current input ends of the power converter; or
the plurality of wiring terminals are all current output ends of the power converter.

6. The power converter according to claim 1, wherein:

an absolute value of a difference between a value of a current flowing through the one wiring terminal in the plurality of wiring terminals and a value of a current flowing through the another wiring terminal other than the one wiring terminal in the plurality of wiring terminals is less than or equal to a first current difference threshold; or an absolute value of a difference between a value of a current flowing through the one wiring terminal in the plurality of wiring terminals and an average value of values of currents flowing through the plurality of wiring terminals other than the one wiring terminal in the plurality of wiring terminals is less than or equal to a second current difference threshold.

7. The power converter according to claim 1, wherein:

a larger absolute value of a difference between a value of a current flowing through the one wiring terminal in the plurality of wiring terminals and a value of a current flowing through the another wiring terminal other than the one wiring terminal in the plurality of wiring terminals indicates a larger first temperature difference threshold; or a larger absolute value of a difference between a value of a current flowing through the one wiring terminal in the plurality of wiring terminals and an average value of values of currents flowing through the plurality of wiring terminals other than the one wiring terminal in the plurality of wiring terminals indicates a larger first temperature difference threshold.

8. A detection method for a terminal status, applied to a power converter, wherein the power converter comprises a control device, a plurality of wiring terminals, a power conversion circuit, and a plurality of temperature detection devices, and the detection method comprises:

obtaining temperature values of the plurality of wiring terminals; and in response to determining that an absolute value of a difference between a temperature value of one wiring terminal in the plurality of wiring terminals and a first reference temperature value is greater than or equal to a first temperature difference threshold, outputting a signal indicating that an abnormality occurs in the plurality of wiring terminals, wherein the first reference temperature value is a temperature value of another wiring terminal other than the one wiring terminal in the plurality of wiring terminals, or the first reference temperature value is an average value of temperature values of a plurality of wiring terminals other than the one wiring terminal in the plurality of wiring terminals; or obtaining a temperature value of the power converter and temperature values of the plurality of wiring terminals; and in response to determining that an absolute value of a difference between a temperature value of one wiring terminal in the plurality of wiring terminals and the temperature value of the power converter is greater than or equal to a second temperature difference threshold, outputting a signal indicating that an abnormality occurs in the plurality of wiring terminals.

9. The detection method according to claim 8, wherein:

the plurality of wiring terminals comprise a first wiring terminal and a second wiring terminal, the first reference temperature value is a temperature value of the second wiring terminal, and the detection method comprises:

in response to determining that an absolute value of a difference between a temperature value of the first wiring terminal and the first reference temperature value is greater than or equal to the first temperature difference threshold, outputting a signal indicating that an abnormality occurs in the first wiring terminal or the second wiring terminal.

10. The detection method according to claim 9, wherein the detection method further comprises:

in response to determining that the temperature value of the first wiring terminal is greater than the first reference temperature value, outputting the signal indicating that an abnormality occurs in the first wiring terminal; or in response to determining that the temperature value of the first wiring terminal is less than the first reference temperature value, outputting the signal indicating that an abnormality occurs in the second wiring terminal.

11. The detection method according to claim 8, wherein:

the plurality of wiring terminals comprise a third wiring terminal and at least two fourth wiring terminals other than the third wiring terminal, the first reference temperature value is an average value of temperature values of the at least two fourth wiring terminals, and the detection method comprises:

in response to determining that an absolute value of a difference between a temperature value of the third wiring terminal and the first reference temperature value is greater than or equal to the first temperature difference threshold, outputting a signal indicating that an abnormality occurs in the third wiring terminal.

12. The detection method according to claim 8, wherein:

the plurality of wiring terminals are all current input ends of the power converter; or the plurality of wiring terminals are all current output ends of the power converter.

13. The detection method according to claim 8, wherein:

an absolute value of a difference between a value of a current flowing through the one wiring terminal in the plurality of wiring terminals and a value of a current flowing through the another wiring terminal other than the one wiring terminal in the plurality of wiring terminals is less than or equal to a first current difference threshold; or an absolute value of a difference between a value of a current flowing through the one wiring terminal in the plurality of wiring terminals and an average value of values of currents flowing through the plurality of wiring terminals other than the one wiring terminal in the plurality of wiring terminals is less than or equal to a second current difference threshold.

14. The detection method according to claim 8, wherein:

a larger absolute value of a difference between a value of a current flowing through the one wiring terminal in the plurality of wiring terminals and a value of a current flowing through the another wiring terminal other than the one wiring terminal in the plurality of wiring terminals indicates a larger first temperature difference threshold; or a larger absolute value of a difference between a value of a current flowing through the one wiring terminal in the plurality of wiring terminals and an average value of values of currents flowing through the plurality of wiring terminals other than the one wiring terminal in the plurality of wiring terminals indicates a larger first temperature difference threshold.

15. A power converter, comprising:

a power conversion circuit, a plurality of wiring terminals, wherein first ends of the plurality of wiring terminals are configured to connect to the power conversion circuit, and second ends of the plurality of wiring terminals are configured to connect to an external circuit;

a plurality of temperature detection devices, configured to detect temperature values of the plurality of wiring terminals and to detect a temperature value of the power converter; and a control device, configured to: in response to determining that an absolute value of a difference between a temperature value of one wiring terminal in the plurality of wiring terminals and the temperature value of the power converter is greater than or equal to a second temperature difference threshold, output a signal indicating that an abnormality occurs in the plurality of wiring terminals.

16. The power converter according to claim 15, wherein:

the plurality of wiring terminals are all current input ends of the power converter; or the plurality of wiring terminals are all current output ends of the power converter.

* * * * *